United States Patent
Baldwin et al.

(10) Patent No.: US 7,882,484 B1
(45) Date of Patent: Feb. 1, 2011

(54) GENERATING A DESIGN-SPECIFIC INPUT/OUTPUT MODEL DOCUMENT

(75) Inventors: Jennifer D. Baldwin, Boulder, CO (US); Paul Cheng, Boulder, CO (US); Philippe Garrault, Grenoble (FR); Hari Devanath, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 440 days.

(21) Appl. No.: 12/053,407

(22) Filed: Mar. 21, 2008

(51) Int. Cl.
*G06F 17/50* (2006.01)
(52) U.S. Cl. .................................. 716/115; 716/116
(58) Field of Classification Search .................. 716/16, 716/115, 116
See application file for complete search history.

(56) References Cited

U.S. PATENT DOCUMENTS 5,740,347 A * 4/1998 Avidan ....................... 714/33
7,451,422 B1 * 11/2008 Slonim et al. ................. 716/16
2005/0177816 A1 * 8/2005 Kudukoli et al. ............ 717/105

* cited by examiner

*Primary Examiner*—Jack Chiang
*Assistant Examiner*—Brandon W Bowers
(74) *Attorney, Agent, or Firm*—Kevin T. Cuenot

(57) ABSTRACT

A method of creating a design-specific I/O model document can include reading a plurality of I/O pin models corresponding to available I/O pin profiles on a target device (355) and identifying I/O pins of the target device that are used by a circuit design (325). An I/O pin profile for each I/O pin of the target device that is used by the circuit design can be determined (345). An I/O pin model can be selected from the plurality of I/O pin models for each I/O pin of the target device that is used by the circuit design according to the I/O pin profiles (355). The design-specific I/O model document for the circuit design can be generated by including each selected I/O pin model within the design-specific I/O model document (365). The design-specific I/O model document can be output (380).

18 Claims, 2 Drawing Sheets

GENERATING A DESIGN-SPECIFIC INPUT/OUTPUT MODEL DOCUMENT

FIELD OF THE INVENTION

The embodiments disclosed herein relate to integrated circuit devices. More particularly, the embodiments relate to creating an input/output (I/O) model document specifying I/O pin models for a circuit design.

BACKGROUND OF THE INVENTION

Circuit designs implemented within integrated circuit devices (ICs) are routinely tested for functionality. It is common practice to simulate circuit designs for ICs using any of a variety of different Electronic Design Automation (EDA) tools. Typically, such circuit designs are to be used within a larger system. For example, the IC usually is mounted upon a circuit board with one or more other ICs and various other electronic components. It then becomes necessary to ensure that each IC interacts with each other IC, on the circuit board level, appropriately.

To do so, the input/output (I/O) behavior of each IC must be characterized. Simulation data as to the specific circuit design of each individual IC will not convey the information that is needed for board level simulation. Other techniques are necessary to simulate the behavior of ICs at the board level to account for I/O behavior of each individual IC.

One way of expressing I/O behavior of individual pins of an IC is through the use of a standard known as the Input/Output Buffer Information Specification (IBIS). Models that specify the behavior of I/O pins for the IC can be created that conform to IBIS or another available specification. I/O pin models that are created for the I/O pins of an IC can be used to implement transmission line-like simulation of the various signals exchanged between I/O pins of the ICs on a circuit board. The I/O pin models do not reveal the inner workings or functionality of the IC itself.

SUMMARY OF THE INVENTION

The embodiments disclosed herein relate to creating a design-specific input/output (I/O) model document for a given circuit design and target device within which the circuit design will be implemented. One embodiment of the present invention can include a computer-implemented method of creating a design-specific I/O model document. The method can include reading a plurality of I/O pin models corresponding to available I/O pin profiles on a target device. I/O pins of the target device that are used by a circuit design can be identified. The method can include determining an I/O pin profile for each I/O pin of the target device that is used by the circuit design and selecting an I/O pin model from the plurality of I/O pin models for each I/O pin of the target device that is used by the circuit design according to the I/O pin profiles. The design-specific I/O model document for the circuit design can be generated by including each selected I/O pin model within the design-specific I/O model document. The design-specific I/O model document can be output.

Reading a plurality of I/O pin models can include reading a generic I/O model document including the plurality of I/O pin models for the target device. The generic I/O model document can include an I/O pin model for each I/O pin available on the target device. In another aspect, reading a plurality of I/O pin models can include identifying each I/O pin model according to an I/O buffer information specification.

Selecting an I/O pin model from the plurality of I/O pin models for each I/O pin of the target device that is used by the circuit design can include selecting an I/O pin specified by the circuit design, wherein the I/O pin of the circuit design has an identified I/O pin profile, locating an I/O pin model from the generic I/O model document having an I/O pin profile matching the I/O pin profile of the selected I/O pin of the circuit design, and creating an association between the I/O pin of the circuit design and the located I/O pin model.

Determining an I/O pin profile for each I/O pin of the target device that is used by the circuit design can include selecting an I/O pin of the circuit design, identifying parameters of the selected I/O pin, and determining an I/O pin profile according to the parameters of the selected I/O pin. In another aspect, determining an I/O pin profile for each I/O pin of the target device that is used by the circuit design can include selecting an I/O pin of the circuit design, identifying parameters of the selected I/O pin, and constructing an I/O pin model name according to the parameters of the selected I/O pin.

Selecting an I/O pin model from the plurality of I/O pin models for each I/O pin of the target device that is used by the circuit design can include locating an I/O pin model from the plurality of I/O pin models that has a name corresponding to the I/O pin model name constructed according to the parameters of the selected I/O pin.

The method can include reading a generic package parasitic document specifying parasitic package information for the target device and including a portion of the package parasitic information, selected from the generic package parasitic document, for each selected I/O pin model within a design-specific package parasitic document. The design-specific package parasitic document can be output. The method further can include, responsive to a user input, automatically retrieving the plurality of I/O pin models from a provider site, wherein the design-specific I/O model document is generated responsive to the user input.

Another embodiment of the present invention can include a computer-implemented method of creating a design-specific I/O model document. The computer-implemented method can include receiving a plurality of I/O pin models corresponding to available I/O pin profiles on a target device and identifying I/O pins of the target device that are used by a circuit design. The method further can include identifying parameters for each I/O pin within the circuit design, constructing an I/O pin model name for each I/O pin of the circuit design according to the parameters of each respective I/O pin, and selecting an I/O pin model from the plurality of I/O pin models for each I/O pin of the circuit design according to the constructed I/O pin model name for each respective I/O pin. The method can include generating the design-specific I/O model document for the circuit design by including each selected I/O pin model within the design-specific I/O model document and outputting the design-specific I/O model document.

Constructing an I/O model name can include, for each I/O pin of the circuit design, determining a value for at least one parameter of the I/O pin and including an identifier within the I/O pin model name corresponding to the value of the at least one parameter of the I/O pin. The method further can include correlating each I/O pin model of the design-specific I/O model document with a user-specified name, determined from the circuit design, for at least one I/O pin of the circuit design.

Yet another embodiment of the present invention can include a computer program product including a computer-usable medium having computer-usable program code that, when executed by a data processing system, causes the data processing system to perform the various steps and/or functions disclosed herein.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to creating a design-specific input/output (I/O) model document. I/O pin models can be maintained and/or updated independently of an Electronic Design Automation (EDA) tool used to create the design-specific I/O model document. The I/O pin models can be specified in, or formatted according to, an industry standard specification. As used herein, the phrase "industry standard specification" can refer to an open format or specification that is readable and accessible by parties other than the provider of a target device or architecture, e.g., third parties. The design-specific I/O model document that is created can specify an I/O pin model for each I/O pin of a given target device or a given target architecture that is used by a circuit design.

By providing I/O pin models formatted according to an industry standard specification that is separate and independent from the EDA tool, the need to maintain I/O pin models within the EDA tool is eliminated. Separating the I/O pin models from the EDA tool that creates the design-specific I/O model document allows the EDA tool to be maintained and updated independently of the I/O pin models. Package parasitic data also can be provided and maintained independently of the EDA tool. Accordingly, updated I/O pin models and package parasitic data can be obtained for a given target architecture or target device and utilized without the need to update or re-install a new or updated version of the EDA tool.

Figure 1:
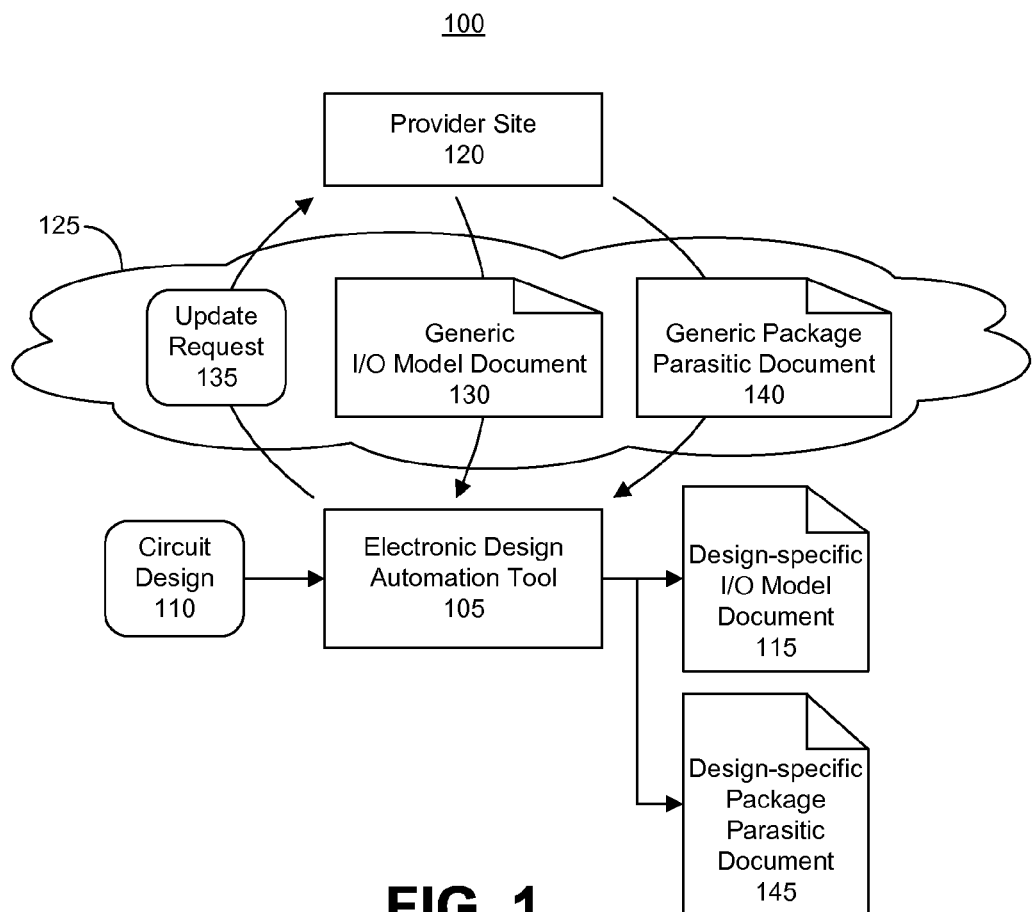
FIG. 1 is a block diagram illustrating a system for creating a design-specific input-output (I/O) model document in accordance with one embodiment of the present invention.

FIG. 1 is a block diagram illustrating a system 100 for creating a design-specific I/O model document in accordance with one embodiment of the present invention. As shown, system 100 can include an EDA tool 105 executing within a data processing system. In one embodiment, the EDA tool 105 can process a circuit design 110 and automatically generate a design-specific I/O model document 115 and design-specific package parasitic document 145 for the circuit design 110. In another embodiment, the EDA tool 105 can be implemented as the IBISWriter Utility as is commercially available from Xilinx, Inc. of San Jose, Calif. (Xilinx). IBIS stands for "I/O Buffer Specification."

One embodiment of the present invention is implemented in a data processing system, e.g., a computer or computer system, suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

I/O devices such as, for example, keyboards, displays, pointing devices, etc., can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The circuit design 110 can be a programmatic circuit design such as one or more hardware description language (HDL) files, a netlist, or the like. In one embodiment, the circuit design 110 can be specified as a Native Circuit Description (NCD) file as is used with implementation tools from Xilinx. An NCD file is a file that represents a physical circuit description of a circuit design as applied to a specified target device. The physical design file can include or specify mapping, placement, and routing data for the circuit design 110 as applied to a the specified target device.

It should be appreciated that the designation of a particular target device will typically specify a particular type of package within which circuitry, e.g., the silicon, will be disposed. For example, the target device can be a programmable logic device (PLD), such as a field programmable gate array (FPGA), having a particular type of packaging. A target architecture, by comparison, can reference the underlying circuitry, but be agnostic with respect to the type of package within which the circuitry is disposed. Accordingly, circuitry having a given target architecture may be disposed in any of a variety of different packages, resulting in a plurality of different target devices, each having a same architecture.

The EDA tool 105 can be communicatively linked with one or more remote data processing systems, referred to as the provider site 120, through a communication network 125. The communication network 125 can be implemented as, or include, without limitation, a wide area network, a local area network, the Public Switched Telephone Network (PSTN), the Web, the Internet, and one or more intranets. The communication network 125 further can be implemented as or include one or more wireless networks, whether short or long range, including mobile communication networks.

The provider site 120, for example, can be a Website or other remotely located, network accessible computer system from which a generic I/O model document 130 and/or a generic package parasitic document 140 can be downloaded. For example, the provider site 120 can be a Website maintained by the designer, provider, or manufacturer of the target device within which the circuit design 110 will be implemented.

The generic I/O model document 130 can include an I/O pin model for each variety of pin that is available on a given target architecture. Each I/O pin model can specify the electrical behavior of an I/O pin having a particular I/O pin profile. An I/O pin model can be included for each different I/O pin profile that can be implemented for the target architecture. Further, for each variety of package available for the target architecture, a different set of I/O pin models can be included in the generic I/O model document 130. It should be appreciated, however, that the generic I/O model document 130 can be configured to include only I/O pin models for available I/O pins of a particular target device.

In illustration, an I/O pin model can specify one or more parameters and parameter values for an I/O pin available in the target architecture. The parameters can include, for example, the I/O standard used, e.g., LVCMOS25, LVCMOS33, etc., the slew rate, the direction of the I/O pin, e.g., input, output, bi-directional, drive strength, the supply voltage of the I/O pin, the location of the I/O pin on the package, e.g., a particular bank in which the I/O pin is located such as left, right, top, or bottom, etc. These parameters, collectively, can specify the I/O pin profile of the I/O pin.

In one embodiment, the generic I/O model document 130 can be formatted according to an industry standard specification such as the IBIS, as promulgated by the American National Standards Institute (ANSI) Standard 656-A, and also referred to as Electronic Industries Alliance (EIA) Standard 656-A, which is fully incorporated herein by reference. IBIS provides a format for specifying models for the I/O pins of an integrated circuit (IC). The models can be used to implement transmission line-like simulation of the various signals exchanged between pins of ICs on a circuit board. It should be appreciated that the embodiments disclosed herein can utilize any industry standard specification for expressing I/O characteristics of pins of an IC.

Each of the I/O models in the generic I/O model document 130 can include at least a minimal amount of package parasitic data. For example, such minimal package parasitic data can be expressed in terms of a minimum and a maximum parasitic capacitance values that can be applied across all I/O pin models. That is, the general package parasitic information does not vary from one I/O pin model to the next even when such I/O pin models have different I/O pin profiles.

The generic package parasitic document 140 can specify more accurate and complete electrical behavior information for I/O pins of a target architecture. The generic package parasitic document 140 can include package parasitic data for a plurality of different types of packages available for a given target architecture or for a single type of package.

In operation, the circuit design 110 can be loaded into the EDA tool 105. Responsive to a user input, the EDA tool 105 can send an update request 135 to the provider site 120. The update request 135 can indicate a particular target architecture within which a user-specified circuit design, e.g., circuit design 110, is to be implemented. In some cases, the update request 135 can specify the particular target device within which the circuit design 110 will be implemented. Responsive to the update request 135, the provider site 120 can begin sending the requested data.

Depending upon the information requested by the update request 135, the provider site 120 can send the generic I/O model document 130, the generic package parasitic document 140, or both. While such data is represented independently, it should be appreciated that some specifications, e.g., IBIS, allow the I/O pin models and the package parasitic data to be combined into a single, larger document. Accordingly, if so configured, the embodiments disclosed herein can provide a single download including both the I/O models, having integrated package parasitic data.

As noted, the generic I/O model document 130 can include I/O pin models for a plurality of target devices or I/O pin models for only a selected target device. Similarly, the generic package parasitics 140 can include package parasitic data for a plurality of target devices or a single target device. The content of the generic I/O model document 130 and the generic package parasitics 140 can depend upon the implementation of the EDA tool 105 and/or the information requested in the update request 135.

The EDA tool 105 can analyze the circuit design 110 and determine the particular target device to be used. The EDA tool 105 can identify the I/O pins of the target device that are utilized by the circuit design 110. Accordingly, the EDA tool 105 can identify and select an I/O pin model from the generic I/O model document 130 for each I/O pin of the target device that is used by the circuit design 110. The selected I/O pin models can be used to generate and output the design-specific I/O model document 115. The design-specific I/O model document 115 can be implemented in, or formatted according to, an industry standard specification, e.g., IBIS. As used herein, "outputting" and/or "output" can mean, for example, writing to a file or storing in memory, writing to a user display or other output device, playing audible notifications, sending or transmitting to another system, exporting, or the like.

The EDA tool 105 can perform a similar process with respect to the generic package parasitic document 140. The EDA tool 105 can select the parasitic data corresponding to the selected I/O pin models and include only that selected package parasitic data within a design-specific package parasitic document 145. The design-specific package parasitic document 145 can be formatted according to an industry standard specification such as IBIS.

Though shown independently, the design-specific I/O model document 115 and the design-specific package parasitic document 145 can be combined into a single, larger design-specific document. When implemented separately, however, the design-specific I/O model document 135 can include references to the design-specific package parasitic document 145. More particularly, each I/O model specified within the design-specific I/O model document 115 can be mapped to particular portions of package parasitic data within the design-specific package parasitic document 145.

Figure 2:
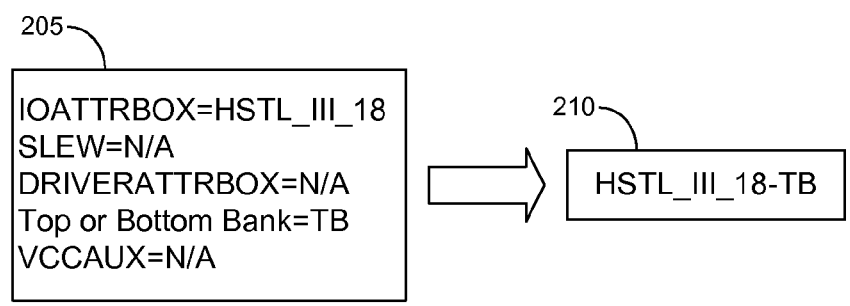
FIG. 2 is a block diagram illustrating a mapping technique for associating I/O pin models with I/O pins of a target device used by a circuit design in accordance with another embodiment of the present invention.

FIG. 2 is a block diagram illustrating a mapping technique for associating I/O pin models with I/O pins of a target device used by a circuit design in accordance with another embodiment of the present invention. FIG. 2 illustrates a data construct representing an I/O pin 205 within a circuit design. The data construct provides a description of the I/O pin 205 and, as such, specifies a plurality of parameters and parameter values (collectively "parameters") of the I/O pin 205. The parameters may be specified in any of a variety of different formats. For example, the particular formatting of the parameters for the I/O pin 205 will depend upon the type of programmatic description of the circuit design that is used and processed.

The EDA tool can search and/or parse the circuit design to locate I/O pins specified therein that are used on the target device. The parameters of the identified I/O pins can be identified along with any user-specified names or labels for the identified I/O pin as indicated within the circuit design. The EDA tool can process the identified parameters for a particular I/O pin, e.g., I/O pin 205, and generate an I/O pin model name 210. As shown, the I/O pin model name 210 is derived from, and dependent upon, the any of the parameters that may be specified for an I/O pin as discussed herein. In this example, the I/O pin model name 210 is a combination of the various parameters values identified for I/O pin 205. The generated I/O model name 210 can be used to locate an I/O pin model having that same, or similar, name from the generic I/O model document. That is, the I/O pin models of the generic I/O pin model document can conform to the naming convention illustrated with respect to FIG. 2.

Once an I/O model is located for an I/O pin of the circuit design, that I/O model can be included in the design-specific I/O model document along with an annotation or indication of the user-specified I/O pin name obtained from the circuit design. The package parasitic data that is associated with the selected I/O pin model can be selected and included within the design-specific package parasitic document. The package parasitic data can employ a same naming convention as the I/O pin models. Alternatively, the I/O pin models can include references or pointers to the package parasitic data within the generic package parasitic document for each respective I/O pin model.

Figure 3:
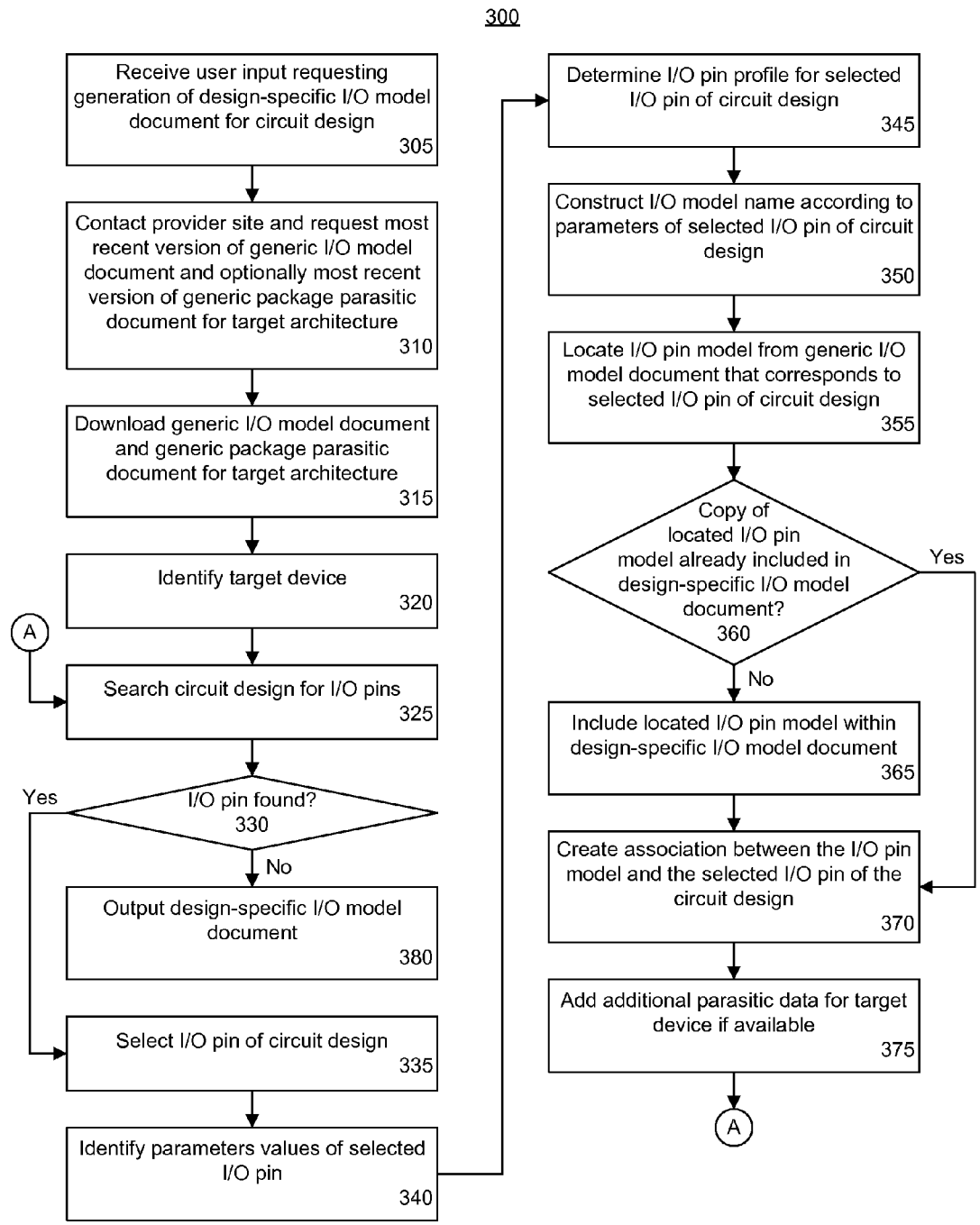
FIG. 3 is a flow chart illustrating a method of creating a design-specific I/O model document in accordance with another embodiment of the present invention.

FIG. 3 is a flow chart illustrating a method 300 of creating a design-specific I/O document in accordance with one embodiment of the present invention. The method 300 can be implemented by an EDA tool as described with reference to FIGS. 1 and 2. The method 300 can begin in a state in which a user-specified circuit design has been loaded into the EDA tool. In step 305, a user input can be received. In one embodiment, the user input can specify a request for the generation of a design-specific I/O model document for the loaded circuit design. The target architecture of the circuit design can be determined automatically from a review of the circuit design or can be explicitly indicated within the user input.

In step 310, the EDA tool can contact the provider site and request the most recent version of the generic I/O model document for the target architecture indicated by the user input. Optionally, the EDA tool can request the most recent version of the generic package parasitic document for the specified target architecture. It should be appreciated that if specific package parasitic data is not needed or desired, the method 300 can be implemented in such a way that package parasitic data is not downloaded and a design-specific package parasitic file is not generated. Such options can be specified within the EDA tool preferences by the user or specified via the user input that invokes the data request to the provider site.

In step 315, the generic I/O model document and the generic package parasitic document can be downloaded from the provider site and stored to a location that is quickly and easily accessible by the EDA tool. For example, the two documents can be stored within the data processing system within which the EDA tool is executing. As noted, in one embodiment, the generic I/O model document and the generic package parasitic document can be formatted according to an industry standard specification, e.g., IBIS files, which can be directly read into, or read by, the EDA tool.

In step 320, the EDA tool can identify the particular target device within which the circuit design will be implemented. For example, such information can be obtained directly from the circuit design or can be obtained via user input provided to the EDA tool.

The EDA tool can begin processing the circuit design loaded therein. In step 325, the EDA tool can begin to search or parse the circuit design for I/O pins. In step 330, if the EDA tool identifies or finds an I/O pin within the circuit design, the method can continue to step 335. If not, the method can proceed to step 380, where the resulting design-specific I/O model document and design-specific package parasitic document, if generated, can be output. As noted, the design-specific I/O model document and the design-specific package parasitic document can be design-specific IBIS files for the user-specified circuit design and target device.

In step 335, the I/O pin found in step 330 can be selected for processing. It should be appreciated that the I/O pin found can be an object or other data construct representing an I/O pin within the circuit design. The particular type of data construct specifying the I/O pin will vary according to the format of the circuit design. In step 340, the EDA tool can identify the parameters and/or parameter values of the selected I/O pin from the circuit design including any label, or other identifier, of the I/O pin that is specified within the circuit design. Such names, tags, labels, etc. for I/O pins are not the same as the I/O pin model name derived from the parameters of the I/O pin. In step 340, the EDA tool can determine an I/O pin profile for the selected I/O pin of the circuit design. The I/O pin profile, as noted, can be derived from, or specified by, the parameters of the selected I/O pin.

In step 350, the EDA tool can construct an I/O pin model name from the parameters of the selected I/O pin of the circuit design. In step 355, the EDA tool can read the generic I/O model document and locate an I/O pin model that corresponds to, or matches, the selected I/O pin of the circuit design. More particularly, the EDA tool, having an understanding of the industry standard format of the generic I/O model document and the generic package parasitic document, can parse the generic I/O model document and search for I/O pin models. In one embodiment, the EDA tool can locate an I/O pin model having a same or similar name as the I/O pin model name generated in step 350. It should be appreciated that in searching for a matching I/O pin model, the EDA tool also can check that the matched I/O pin model is for the same target device as was specified by the user or within the circuit design.

In step 360, the EDA tool can determine whether a copy of the located I/O pin model has already been included within a design-specific I/O model document that is being created for the user-specified circuit design. For example, upon beginning the process, the EDA tool can create a shell document into which I/O pin models can be inserted. The shell document, upon completion, will represent a design-specific I/O model document as the document will only include an I/O pin model for each I/O pin of the target device that is utilized by the circuit design.

If a copy of the located I/O pin model is already included within the design-specific I/O model document, the method can continue to step 370. In step 370, as the located I/O pin model is already within the design-specific I/O model document, an association between the selected I/O pin of the circuit design and the located I/O pin model, as specified within the design-specific I/O model document, can be created within the design-specific I/O model document. For example, within the design-specific I/O model document, the located I/O pin model can be mapped or associated with the selected I/O pin by creating associations, or correlating, the I/O pin model with any user-specified labels or names for the selected I/O pin that may be found within the circuit design.

If a copy of the located I/O pin model is not found within the design-specific I/O model document, a copy of the located I/O pin model can be included within the design-specific I/O model document in step 365. After step 365, the method can continue to step 370, where an association can be created between the copy of the I/O pin model included within the design-specific I/O model document and the selected I/O pin from the circuit design.

In step 375, if package parasitic data is to be generated, such data can be added to a design-specific package parasitic document. The design-specific I/O model document can include a reference or pointer to the design-specific package parasitic document. Further, each individual I/O pin model of the design-specific I/O model document can include a pointer or reference to the parasitic data within the design-specific package parasitic document that is associated with that I/O pin model. As noted, the package parasitic data can specify parasitics of the package of the target device with greater specificity than is available solely within the I/O pin models.

After step 375, the method can loop back to step 325 to continue searching for further I/O pins within the user-specified circuit design. The method can continue until such time that each of the I/O pins of the user-specified circuit design has been identified and processed.

While the specification of I/O pin models largely has been described with reference to IBIS, it should be appreciated that other techniques for specifying I/O pin models can be used. Specifying I/O pin models using an I/O specification such as IBIS allows the electrical behavior of I/O pins to be described without reference to the underlying transistor layout of the circuitry. In some instances, for example, for high speed I/O pins, a specification such as IBIS may not be suitable or provide sufficient accuracy for specifying electrical behavior of the I/O pins. In those cases, techniques that encompass other open, or industry standard, specifications as well as proprietary languages or standards can be used.

For example, in terms of other industry standard specifications, behavioral Verilog, Verilog-AMS (IEEE Standard 1365 supporting mixed signal extensions), or VHDL-AMS (IEEE Standard 1076.1) may be used. Verilog-AMS is a derivative of HDL Verilog (IEEE Standard 1364) that includes analog and mixed-signal extensions. In terms of proprietary solutions, I/O pin models can be expressed using Synopsys HSPICE available from Synopsys, Inc. of Mountain View, Mentor Eldo RF available from Mentor Graphics of San Jose, Calif., or the like. Each of the specifications, standards, and languages noted within this specification are hereby incorporated by reference.

The flowchart in the figures illustrates the architecture, functionality, and operation of possible implementations of systems, methods and computer program products according to various embodiments of the present invention. In this regard, each block in the flowchart may represent a module, segment, or portion of code, which comprises one or more portions of computer-usable program code that implements the specified logical functions.

It should be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. It also should be noted that each block of the flowchart illustration, and combinations of blocks in the flowchart illustration, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one data processing system or in a distributed fashion where different elements are spread across several interconnected data processing systems. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The embodiments disclosed herein can be embodied in other forms without departing from the spirit or essential parameters thereof. Accordingly, reference should be made to the following claims, rather than to the foregoing specification, as indicating the scope of the various embodiments of the present invention.

What is claimed is:

1. A method of creating a design-specific input/output (I/O) model document, the method comprising:
   reading a plurality of I/O pin models corresponding to available I/O pin profiles on a target device;
   identifying I/O pins of the target device that are used by a circuit design;
   determining an I/O pin profile for each I/O pin of the target device that is used by the circuit design;
   selecting an I/O pin model from the plurality of I/O pin models for each I/O pin of the target device that is used by the circuit design according to the I/O pin profiles;
   generating, by a processor, the design-specific I/O model document for the circuit design by including each selected I/O pin model within the design-specific I/O model document;
   reading generic package parasitic information specifying package parasitic information for the target device; and
   including package parasitic information, selected from the generic package parasitic information, for each selected I/O pin model within a design-specific package parasitic document.

2. The method of claim 1, wherein reading a plurality of I/O pin models comprises reading a generic I/O model document comprising the plurality of I/O pin models for the target device, wherein the generic I/O model document an I/O pin model for each I/O pin available on the target device.

3. The method of claim 2, wherein selecting an I/O pin model from the plurality of I/O pin models for each I/O pin of the target device that is used by the circuit design comprises:

selecting an I/O pin specified by the circuit design, wherein the I/O pin of the circuit design has an identified I/O pin profile;

locating an I/O pin model from the generic I/O model document having an I/O pin profile matching the I/O pin profile of the selected I/O pin of the circuit design; and creating an association between the I/O pin of the circuit design and the located I/O pin model.

4. The method of claim 1, wherein determining an I/O pin profile for each I/O pin of the target device that is used by the circuit design comprises:

selecting an I/O pin of the circuit design;

identifying parameters of the selected I/O pin; and determining an I/O pin profile according to the parameters of the selected I/O pin.

5. The method of claim 1, wherein determining an I/O pin profile for each I/O pin of the target device that is used by the circuit design comprises:

selecting an I/O pin of the circuit design;

identifying parameters of the selected I/O pin; and constructing an I/O pin model name according to the parameters of the selected I/O pin.

6. The method of claim 5, wherein selecting an I/O pin model from the plurality of I/O pin models for each I/O pin of the target device that is used by the circuit design comprises locating an I/O pin model from the plurality of I/O pin models that has a name corresponding to the I/O pin model name constructed according to the parameters of the selected I/O pin.

7. The method of claim 1, wherein reading a plurality of I/O pin models comprises identifying I/O pin models according to an I/O buffer information specification.

8. The method of claim 1, further comprising, responsive to a user input, automatically retrieving the plurality of I/O pin models from a provider site, wherein the design-specific I/O model document is generated responsive to the user input.

9. A non-transitory computer-readable medium having instructions recorded thereon for implementing a method of creating a design-specific input/output (I/O) model document, the method comprising:

reading a plurality of I/O pin models corresponding to available I/O pin profiles on a target device;

identifying I/O pins of the target device that are used by a circuit design;

determining an I/O pin profile for each I/O pin of the target device that is used by the circuit design;

selecting an I/O pin model from the plurality of I/O pin models for each I/O pin of the target device that is used by the circuit design according to I/O pin profile;

generating the design-specific I/O model document for the circuit design by including each selected I/O pin model within the design-specific I/O model document;

reading generic package parasitic information specifying package parasitic information for the target device; and including package parasitic information, selected from the generic package parasitic information, for each selected I/O pin model within a design-specific package parasitic document.

10. The computer-readable medium of claim 9, wherein reading a plurality of I/O pin models comprises reading a generic I/O model document comprising the plurality of I/O pin models for the target device, wherein the generic I/O model document comprises an I/O pin model for each I/O pin available on the target device.

11. The computer-readable medium of claim 10, wherein selecting an I/O pin model from the plurality of I/O pin models for each I/O pin of the target device that is used by the circuit design comprises:

selecting an I/O pin specified by the circuit design, wherein the I/O pin of the circuit design has an identified I/O pin profile;

locating an I/O pin model from the generic I/O model document having an I/O pin profile matching the I/O pin profile of the selected I/O pin of the circuit design; and creating an association between the I/O pin of the circuit design and the located I/O pin model.

12. The computer-readable medium of claim 9, wherein determining an I/O pin profile for each I/O pin of the target device that is used by the circuit design comprises:

selecting an I/O pin of the circuit design;

identifying parameters of the selected I/O pin; and determining an I/O pin profile according to the parameters of the selected I/O pin.

13. The computer-readable medium of claim 9, wherein determining an I/O pin profile for each I/O pin of the target device that is used by the circuit design comprises:

selecting an I/O pin of the circuit design;

identifying parameters of the selected I/O pin; and constructing an I/O pin model name according to the parameters of the selected I/O pin.

14. The computer-readable medium of claim 13, wherein selecting an I/O pin model from the plurality of I/O pin models for each I/O pin of the target device that is used by the circuit design comprises locating an I/O pin model from the plurality of I/O pin models that has a name corresponding to the I/O pin model name constructed according to the parameters of the selected I/O pin.

15. The computer-readable medium of claim 9, wherein reading a plurality of I/O pin models comprises identifying I/O pin models according to an I/O buffer information specification.

16. The computer-readable medium of claim 9, further comprising, responsive to a user input, automatically retrieving the plurality of I/O pin models from a provider site, wherein the I/O model document is generated responsive to the user input.

17. A method of creating a design-specific input/output (I/O) model document, the method comprising:

receiving a plurality of I/O pin models corresponding to available I/O pin profiles on a target device;

selecting each I/O pin model from the plurality of I/O pin models corresponding to I/O pins specified in a circuit design for inclusion in an I/O specific model document;

including, via a processor, each selected I/O pin model within the I/O specific model document;

receiving generic package parasitic information for the target device; and including, via the processor, package parasitic information, selected from the generic package parasitic information, for each selected I/O pin model within a design-specific package parasitic document.

18. The method of claim 17, further comprising:

providing the I/O specific model document and the design-specific package parasitic document together as a single, unified document.

\* \* \* \* \*